United States Patent [19]

Starke

[11] 3,776,524
[45] Dec. 4, 1973

[54] WATER PURIFICATION
[76] Inventor: Richard A. Starke, 37, 4th Ave. Parktown North, Johannesburg, Republic of South Africa
[22] Filed: Dec. 14, 1971
[21] Appl. No.: 207,904

[52] U.S. Cl................. 259/4, 137/101.27, 210/264
[51] Int. Cl............................................ B01f 15/04
[58] Field of Search................. 210/97, 264; 259/4, 259/18, 36, 5, 6, 7, 8, 23, 24; 137/101.25, 101.27

[56] References Cited
UNITED STATES PATENTS
2,758,716  8/1956  Oswald.................................. 259/4
2,900,176  8/1959  Krogel.................................. 259/4
3,563,517  2/1971  Harriman.............................. 259/18
3,718,319  2/1973  Weisman................................ 259/4

Primary Examiner—Robert W. Jenkins
Attorney—Richard K. Stevens et al.

[57] ABSTRACT

A mixing chamber particularly useful in mixing gaseous chlorine with water, the chamber having a float controlled inlet and an outlet dipping below the water level established by the float controlled valve and having at a position above the water level an orifice and a chlorine gas inlet between the orifice and water level, the orifice being such as to limit the negative pressure in the chlorine gas inlet when water passes through the orifice under suction applied to the outlet.

3 Claims, 3 Drawing Figures

PATENTED DEC 4 1973 3,776,524

WATER PURIFICATION

This invention relates to the chlorination of water for the purposes of sterilizing the water and more particularly the invention relates to the chlorination of water by means of gaseous chlorine produced in an electrolytic cell.

It has been proposed to chlorinate water, for example, swimming pool water, by means of gaseous chlorine produced in an electrolytic cell generally from sodium chloride, this being considered a less costly and more effective method than simply adding chlorine releasing compounds such as hypochlorite to the water. The reason is that salt is greatly cheaper than hypochlorite compounds and also using gaseous chlorine enables the chlorine level to be maintained more constant at the desired level than is generally possible with hypochlorites. Also, using gaseous chlorine does not give rise to any build up of insoluble by-products in the water, this being of particular importance in the case of swimming pools where the water may not be changed for a number of years.

The most relevant publication of such a system utilizing gaseous chlorine is U.S. Patent No. 3,223,242. However, this specification, as well as other unpublished proposals in this field, have all proposed that the chlorine gas produced in the electrolytic cell be admixed with air in the cell prior to being sucked out under vacuum into a stream of water. The air inlet to the cell is necessary to prevent the brine solution therein from being drawn out of the cell and also purportedly has the advantage of simultaneously aerating the water.

However, in practice, when applied to a swimming pool, this aeration is not generally necessary, since the water will automatically absorb sufficient air for this purpose and also the presence of air with the chlorine inhibits the dissolution of the chlorine gas with obvious disadvantages arising i.e., waste of chlorine gas and consequent increase of costs thereof as well as possible insufficient dissolution of chlorine gas.

It is the object of this invention to provide means whereby the introduction of air into such a system is rendered unnecessary thereby eliminating the above-described disadvantages.

In accordance with this invention there is provided a mixing chamber suitable for use in a system of the above-described type comprising a float controlled liquid inlet adapted to maintain a predetermined liquid level in use, an outlet passage having an inner and an outer end, the inner end being located below said predetermined water level and the outlet passage extending in an upward direction above said predetermined level, a second inlet communicating with said outlet passage and a constriction defining an orifice in the outlet passage between the second inlet and outer end of the outlet passage.

A further feature of the invention provides for the orifice to have a closure member associated therewith, the closure member being operated by the float such that it seals the orifice if the level of the liquid in the chamber falls below a predetermined minimum level.

The invention provides also a water filtering system wherein a supply of water under pressure is connected to the liquid inlet of a mixing chamber as above defined, a supply of chlorine gas is connected to the second inlet and the outlet passage is connected to a water pipe associated with the filter system, such that a negative pressure is applied to the outlet in operation.

A preferred embodiment of the invention as applied to a swimming pool filtration plant will now be described with reference to the accompanying drawings in which.

Figure 1:
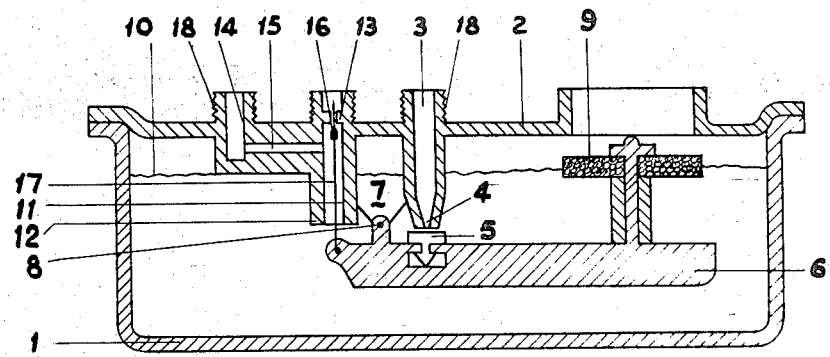
FIG. 1 is a sectional elevation of a mixing chamber.

In this embodiment of the invention the mixing chamber comprises an open topped vessel 1 fitted with a lid 2 releasably secured thereto. The lid has moulded integral therewith a vertical inlet tube 3, the lower end 4 of which is controlled by a soft rubbery closure member 5 mounted on a float arm 6 pivoted to a support 7 therefor (as indicated at 8) which is also moulded integral with the lid.

The float arm is fitted with a float 9 at one end thereof arranged to allow water to enter through the inlet tube 3 to a predetermined level indicated by numeral 10.

The lid also has a vertical outlet tube 11 moulded integral therewith, this tube having its lower end 12 extending below said predetermined water level 10 and having a constriction therein defining an orifice 13 located a predetermined distance above said water level 10. The lid further carries a chlorine gas inlet 14 which is interconnected by a passage 15 to the outlet tube 11, the passage 15 entering the outlet tube below the orifice 13.

Finally, the orifice has a closure member 16 associated therewith and openable by means of a non-corrosive wire 7 (such as titanium wire) passing through the orifice and connected at its lower end to the end 18 of the float arm on the opposite side of the pivot to the float 9. This closure member is arranged to close off the outlet in the event of the water level in the vessel dropping below a predetermined minimum, for example, the lower end 12 of the outlet tube 11.

The upper ends of the two inlet tubes 14 and 3 and the outlet tube 11 are all provided with screw threaded spigot ends 18 to enable them to be easily connected to flexible or other tubes by means of a union nut.

In use, the inlet tube is connected to a source of supply of water under pressure, this generally being on the outlet side of a filter pump whilst the outlet tube is connected to a point of negative pressure in the recirculation system to mix chlorine gas with the circulatory water. The chlorine gas inlet 14 is connected to the anode chamber 31 of an electrolytic cell 32 which need now have no air inlet and which may have its top sealed to provide a closed volume at the top of this chamber.

In operation the water level is maintained at the desired level by means of the float controlled inlet and the negative pressure will withdraw chlorine gas into the outlet tube. The negative pressure will in general be appreciable and thus the liquid level will rise in the outlet tube up to the orifice. This has the effect of creating a negative pressure in the chlorine inlet of roughly the height of a column of water extending from the predetermined liguid level to the orifice, this height being in practice conveniently about ½ an inch to 1 inch. This height is governed by the practical dimensions of the anode compartment of the electrolytic cell with which it is to be used and is such that the electrolyte in the anode compartment does not rise sufficiently to be drawn out with the chlorine gas. As soon as the negative pressure in the chlorine inlet tube exceeds the above amount, the water passes into the orifice and owing to the high resistance to flow of water therethrough, the negative pressure in the chlorine inlet does not increase. In practice, therefore, water will be sucked through the orifice with chlorine gas almost continuously owing to the generally high degree of vacuum applied to the outlet. In practice also, this mixing chamber has proved to be effective and enables just sufficient vacuum to be applied to the anode compartment of an electrolytic cell to induce the chlorine gas to leave the anode whilst ensuring that no electrolyte is drawn into the chlorine outlet from the cell.

Figure 2:
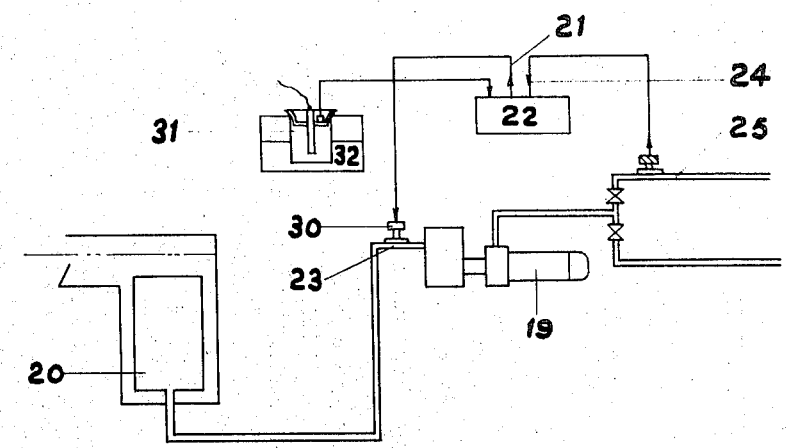
FIGS. 2 and 3 are diagrams illustrating the application of the mixing chamber to two different types of swimming pool filtration plants.

The actual arrangement of the mixing chamber in a swimming pool filter system will, of course, vary according to the design thereof. Thus, as illustrated in FIG. 2, where the filter unit is a suction type wherein the pump 19 sucks water through the filter 20, the outlet 21 from the mixing chamber 22 may simply be connected to the inlet 23 to the pump and the water outlet 24 to the mixing chamber to the outlet side 25 of the pump provided there is sufficient pressure to ensure that the mixing chamber has an adequate supply of water. If this pressure is insufficient a restriction may have to be provided on the outlet side of the connection to ensure an adequate water supply for the mixing chamber.

Figure 3:
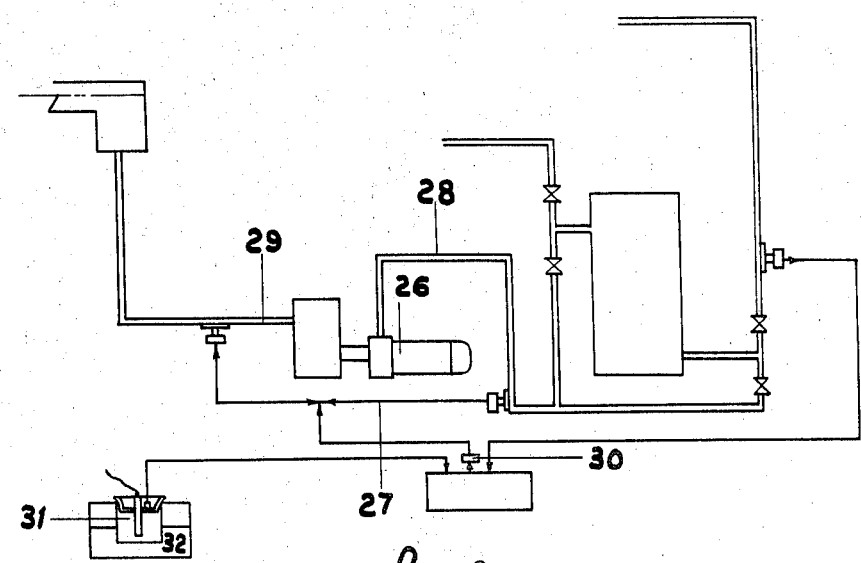

With a pressure filter (as indicated in FIG. 3), the pump 26 is often below water and thus insufficient negative pressure may be obtained to withdraw the chlorine gas into the water pipes. In this case a by-pass 27 is provided from the high pressure side 28 of the pump to the inlet side 29 thereof, this bypass including a venturi to provide the required negative pressure. Thus, in this case the chlorine gas and water from the mixing chamber are drawn into the bypass and thence into the pump inlet. This, of course, will not be necessary when a pressure filter is used and the pump is located above the swimming pool water level.

In either of the cases illustrated above the mixing chamber will become flooded during periods of non-operation if it is located below water level and to avoid this a non-return valve 30 is included at the outlet to prevent water from entering through this path.

Whilst the above has been described particularly as applied to swimming pools, it will be appreciated that the mixing chamber may well find other applications and these are intended to fall within the scope of this invention. Also, the design of the mixing chamber may be altered to suit requirements.

What I claim as new and desired to secure by Letters Patent is:

1. A mixing chamber suitable for use in a system of the above-described type comprising a float controlled liquid inlet adapted to maintain a predetermined liquid level in use, an outlet passage having an inner and an outer end, the inner end being located below said predetermined liquid level, and the outlet passage extending in an upward direction above said predetermined level, a second inlet communicating with said outlet passage and a constriction defining an orifice in the outlet passage between the second inlet and outer end of the outlet passage.

2. A mixing chamber as claimed in claim 1 in which the orifice has a closure member associated therewith, the closure member being operated by the float such that it seals the orifice if the liquid level in the chamber falls below a predetermined minimum level.

3. A mixing chamber as claimed in claim 1 in which the inlets and outlet are moulded integral with a lid which together with a vessel forms the mixing chamber.

* * * * *